(12) United States Patent
Ho (10) Patent No.: US 9,329,323 B2
(45) Date of Patent: May 3, 2016

(54) LIGHT SOURCE AND BACKLIGHT MODULE HAVING THE SAME

(71) Applicant: Au Optronics Corporation, Hsinchu (TW)

(72) Inventor: Chen-Hung Ho, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/799,585

(22) Filed: Jul. 15, 2015

(65) Prior Publication Data

US 2015/0316704 A1 Nov. 5, 2015

Related U.S. Application Data

(63) Continuation of application No. 13/005,545, filed on Jan. 13, 2011, now abandoned.

(30) Foreign Application Priority Data

Nov. 4, 2010 (TW) ................................ 99137995 A (51) Int. Cl.
*F21V 8/00* (2006.01)
(52) U.S. Cl.
CPC ............ *G02B 6/0031* (2013.01); *G02B 6/0068* (2013.01); *G02B 6/0073* (2013.01); *G02B 6/009* (2013.01)

(58) Field of Classification Search
CPC .... G02B 6/009; G02B 6/0031; G02B 6/0068; G02B 6/0073
See application file for complete search history.

(56) References Cited

U.S. PATENT DOCUMENTS

| | | | |
|---|---|---|---|
| 8,915,634 B2 * | 12/2014 | Hsu ......................... | F21V 5/002 345/102 |
| 9,057,806 B2 * | 6/2015 | Ho ......................... | G02F 6/0021 |
| 2012/0113619 A1 * | 5/2012 | Ho ........................ | G02B 6/0031 362/97.1 |

* cited by examiner

*Primary Examiner* — Stephen F Husar
(74) *Attorney, Agent, or Firm* — Jianq Chyun IP Office (57) ABSTRACT

A light source includes a carrier, a plurality of solid-state light-emitting devices, a plate photo-coupler, a first reflector, and a plurality of second reflectors. The solid-state light-emitting devices and the light-incoupling component are configured on the carrier. The light-incoupling component has a bottom surface, a top surface, a plurality of side surfaces adjoining the bottom surface and the top surface, and a through hole extending from the bottom surface to the top surface. The solid-state light-emitting devices are located in the through hole. The first reflector covers the through hole. The second reflectors are configured on the side surfaces. Light emitted from the solid-state light-emitting devices enters the light-incoupling component via a sidewall of the through hole and leaves the light-incoupling component via the top surface thereof.

19 Claims, 7 Drawing Sheets

LIGHT SOURCE AND BACKLIGHT MODULE HAVING THE SAME

CROSS-REFERENCE TO RELATED APPLICATION

This application is a continuation application of and claims the priority benefit of a prior application Ser. No. 13/005,545, filed on Jan. 13, 2011, now abandoned. The prior application Ser. No. 13/005,545 claims the priority benefit of Taiwan application serial no. 99137995, filed on Nov. 4, 2010. The entirety of each of the above-mentioned patent applications is hereby incorporated by reference herein and made a part of this specification.

BACKGROUND OF THE INVENTION

1. Field of the Invention

The invention relates to a backlight module, and more particularly to a design of a light source in a backlight module.

2. Description of Related Art

In recent years, liquid crystal displays (LCDs) that have been developed to achieve full-color display gradually replace conventional cathode ray tube (CRT) displays and have become mainstream displays in the market due to the advantages of low operation voltages, non-radiation, light weight, small volume occupancy, and so forth. The LCDs are non-self-illuminating displays, and therefore display functions of the LCDs are achieved when the required light is provided by backlight modules. With increasing consciousness of environmental protection, cold cathode fluorescent lamps (CCFLs) serving as light-emitting devices in conventional backlight modules are gradually replaced by light-emitting diode (LED) devices that are more friendly to the environment.

Figure 1:
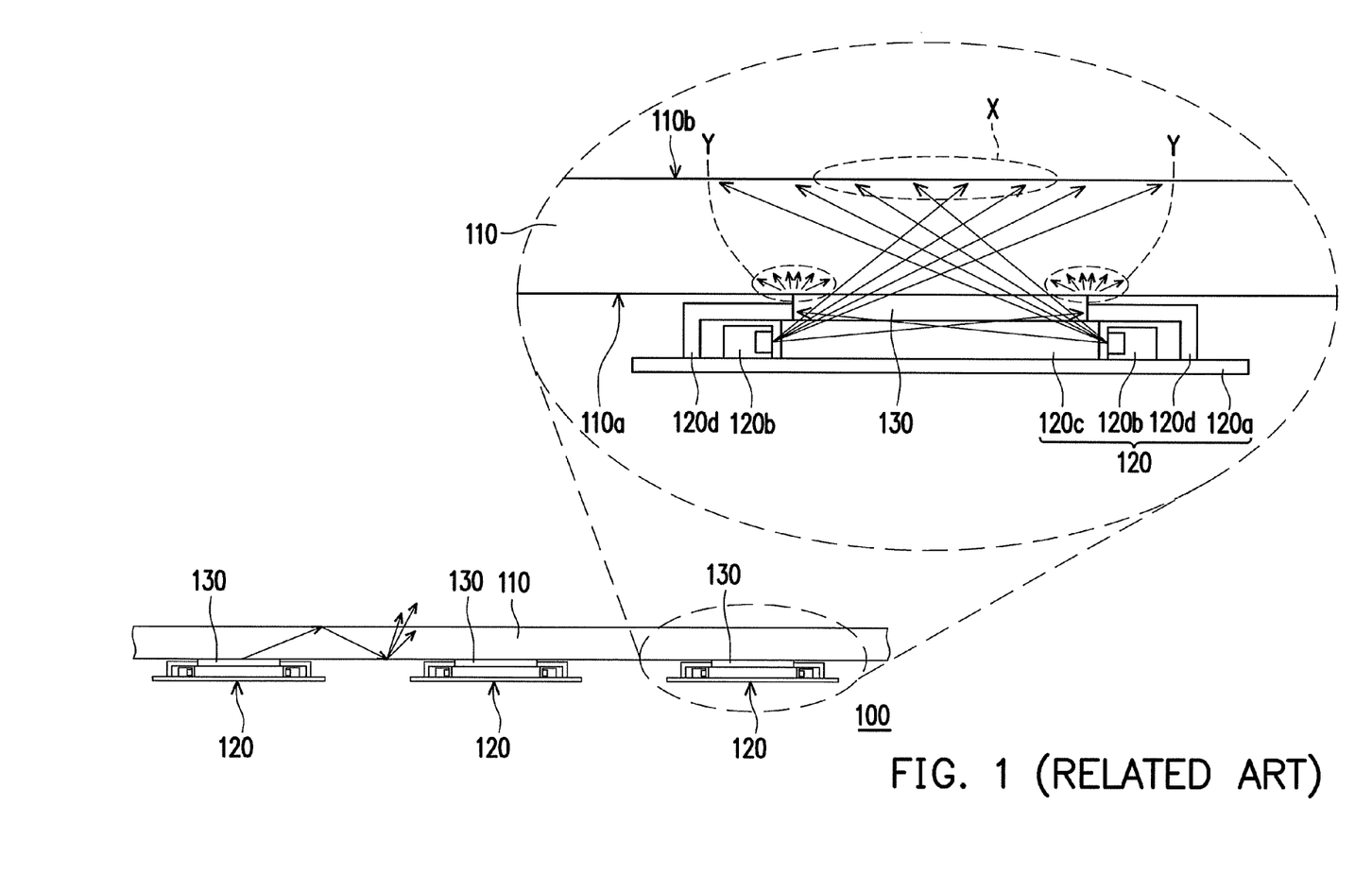
FIG. 1 is a schematic cross-sectional view illustrating a conventional backlight module.

FIG. 1 is a schematic cross-sectional view illustrating a conventional backlight module. With reference to FIG. 1, a conventional backlight module 100 includes a light guide plate (LGP) 110, a plurality of light sources 120, and a plurality of optical clear adhesives 130. The LGP 110 has a light-incident surface 110a and a light-emitting surface 110b opposite to the light-incident surface 110a. Each of the light sources 120 is adhered to the light-incident surface 110a of the LGP 110 via one of the corresponding optical clear adhesives 130, respectively.

As shown in FIG. 1, each of the light sources 120 includes a carrier 120a, a plurality of LED devices 120b, a light-incoupling component 120c, and a plurality of ring-shaped reflectors 120d. The LED devices 120b and the light-incoupling component 120c are configured on the carrier 120a. Light emitted from the LED devices 120b enters the light-incoupling component 120c from side surfaces S of the light-incoupling component 120c and leaves the light-incoupling component 120c from a top surface T of the light-incoupling component 120c. The ring-shaped reflectors 120d cover the LED devices 120b and an edge of the top surface T. Besides, the top surface T of the light-incoupling component 120c is adhered to the light-incident surface 110a of the LGP 110 via the optical clear adhesive 130.

As indicated in the region X of FIG. 1, the light emitted from the light source 120 in FIG. 1 is excessively concentrated on top of the light-incoupling component 120c. In addition, a part of the light emitted from each of the LED devices 120b passes through the correspondingly optical clear adhesive 130 and is then reflected by the sidewall of each of the ring-shaped reflectors 120d, which causes light leakage as indicated in the region Y of FIG. 1. Accordingly, the conventional backlight module 100 has unfavorable optical uniformity, and said problem requires an effective solution.

SUMMARY OF THE INVENTION

The invention is directed to a light source and a backlight module that have favorable optical characteristics.

The invention provides a light source that includes a carrier, a plurality of solid-state light-emitting devices, a plate photo-coupler, a first reflector, and a plurality of second reflectors. The solid-state light-emitting devices and the light-incoupling component are configured on the carrier. The light-incoupling component includes a bottom surface, a top surface, a plurality of side surfaces adjoining the bottom surface and the top surface, and a through hole extending from the bottom surface to the top surface. The solid-state light-emitting devices are located in the through hole. The first reflector covers the through hole. The second reflectors are configured on the side surfaces. Light emitted from the solid-state light-emitting devices enters the light-incoupling component via a sidewall of the through hole and leaves the light-incoupling component via the top surface thereof.

According to an embodiment of the invention, the carrier is a circuit board, for instance.

According to an embodiment of the invention, the solid-state light-emitting devices are side-view LED packages, for instance.

According to an embodiment of the invention, each of the solid-state light-emitting devices has a light-emitting surface, and each of the light-emitting surfaces faces the sidewall of the through hole.

According to an embodiment of the invention, a shape of the first reflector and a shape of the through hole are substantially the same.

According to an embodiment of the invention, the through hole includes a circular through hole, an elliptical through hole, or a polygonal through hole.

According to an embodiment of the invention, the sidewall of the through hole includes a plurality of curved surfaces.

According to an embodiment of the invention, the first reflector is a reflective plate, and the first reflector and the top surface of the light-incoupling component are substantially on the same plane.

According to an embodiment of the invention, a gap is between the first reflector and the solid-state light-emitting devices.

According to an embodiment of the invention, the second reflectors include a plurality of reflective plates or a plurality of reflective coatings.

According to an embodiment of the invention, the light source can further include an optical filler that fills the through hole and encapsulates the solid-state light-emitting devices. A refractive index of the optical filler is different from a refractive index of the plate photo-coupler.

According to an embodiment of the invention, the light source can further include a third reflective layer configured between the carrier and the bottom surface of the plate photo-coupler. For instance, the third reflective layer is a white sheet.

The invention further provides a backlight module that includes at least one light source described above, an LGP, and at least one optical clear adhesive. The LGP has a light-incident surface and a light-emitting surface opposite to the light-incident surface. The first reflector of the light source and the top surface of the light-incoupling component are adhered to the light-incident surface of the LGP via the optical clear adhesive.

According to an embodiment of the invention, a top/bottom surface of the LGP has a plurality of optical micro-structures, and the optical micro-structures are dots, V-cuts, or other optical micro-structures suitable for scattering light, for instance.

The solid-state light-emitting devices are configured in the through hole of the plate photo-coupler, and the first reflector covering the through hole and the second reflectors configured on the side surfaces of the light-incoupling component allow the light to be emitted uniformly from the top surface of the light-incoupling component according to this invention. Hence, the light source and the backlight module mentioned above have favorable optical characteristics.

To make the above and other features and advantages of the invention more comprehensible, several embodiments accompanied with figures are detailed as follows.

BRIEF DESCRIPTION OF THE DRAWINGS

The accompanying drawings are included to provide further understanding, and are incorporated in and constitute a part of this disclosure. The drawings illustrate exemplary embodiments and, together with the description, serve to explain the principles of the disclosure.

DESCRIPTION OF EMBODIMENTS

Figure 2A:
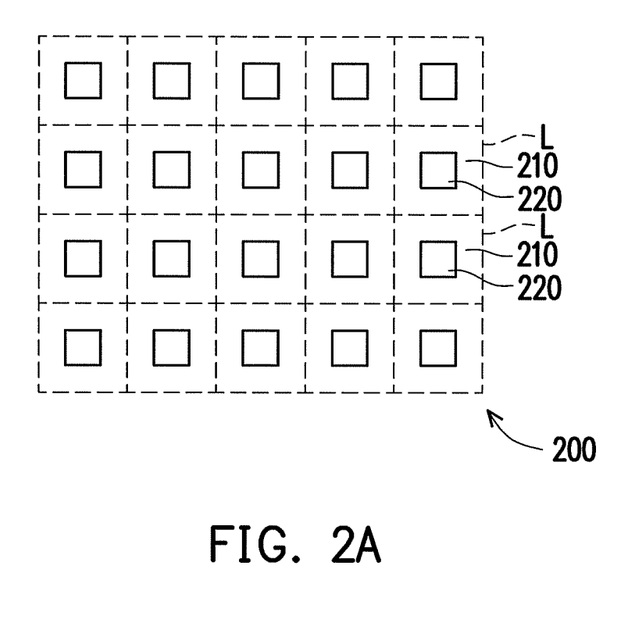
FIG. 2A is a schematic bottom view illustrating a backlight module according to an embodiment of the invention.
Figure 2B:
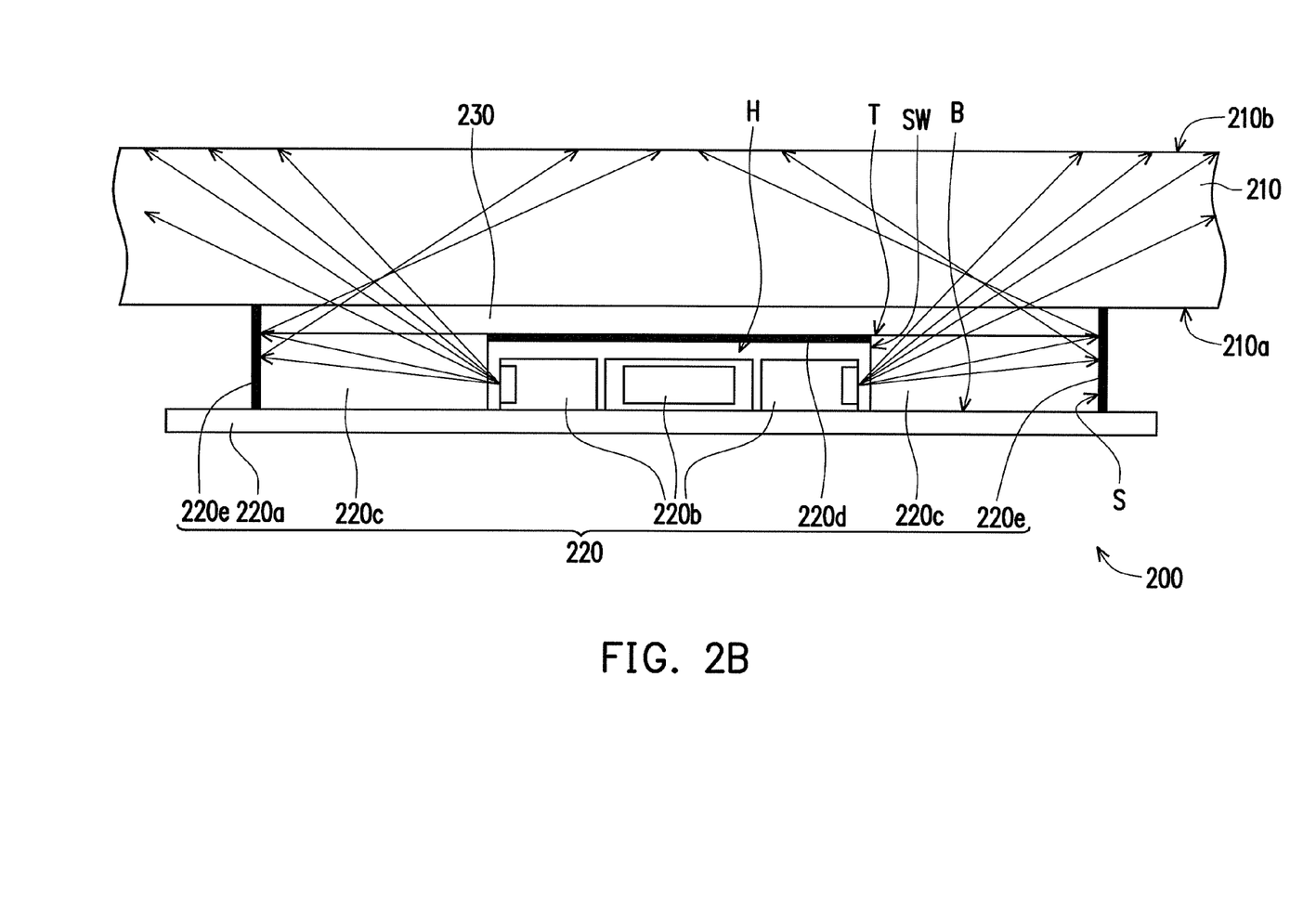
FIG. 2B is a schematic cross-sectional view illustrating a backlight module according to an embodiment of the invention.
Figure 2C:
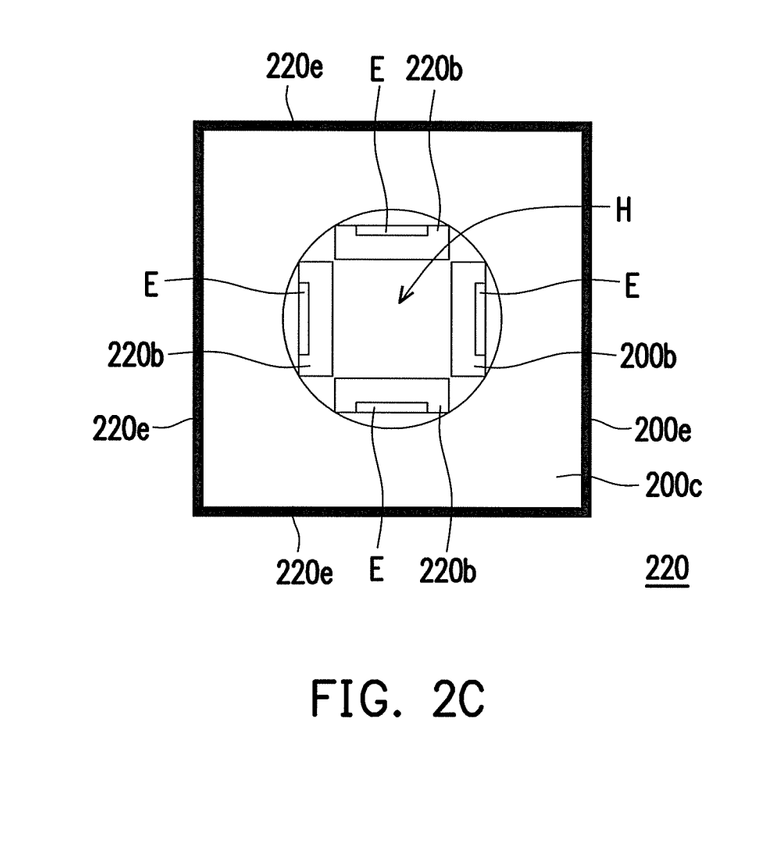
FIG. 2C is a schematic top view illustrating a light source according to an embodiment of the invention.

FIG. 2A is a schematic bottom view illustrating a backlight module according to an embodiment of the invention. FIG. 2B is a schematic cross-sectional view illustrating a backlight module according to an embodiment of the invention. FIG. 2C is a schematic top view illustrating a light source according to an embodiment of the invention. With reference to FIG. 2A to FIG. 2C, the backlight module 200 of this embodiment includes an LGP 210, one or more light sources 220, and one or more optical clear adhesives 230. The LGP 210 has a light-incident surface 210a and a light-emitting surface 210b opposite to the light-incident surface 210a. Each of the light sources 220 is adhered to the light-incident surface 210a of the LGP 210 via one of the optical clear adhesives 230, respectively. In this embodiment, the number of the light sources 220 in the backlight module 200 can be properly adjusted based on actual product requirements. For instance, when the backlight module 200 is applied to a small-scale LCD panel, the backlight module 200 can have a single light source 220. By contrast, when the backlight module 200 is applied to a medium-scale or a large-scale LCD panel, the backlight module 200 can have a plurality of light sources 220 arranged in arrays. As indicated in FIG. 2A, the light sources 220 are equidistantly arranged below the LGP 210, and each of the light sources 220 corresponds to one sub-illuminating region L on the LGP 210. In this embodiment, the distance between two adjacent light sources 220 is relevant to the optical design of the light sources 220. People having ordinary skill in the pertinent art are able to adjust the distance between the adjacent light sources 220 based on the optical design of the light sources 220, and the distance between the adjacent light sources 220 is not limited in this embodiment.

With reference to FIG. 2B and FIG. 2C, each of the light sources 220 of this embodiment includes a carrier 220a, a plurality of solid-state light-emitting devices 220b, a light-incoupling component 220c, a first reflector 220d, and a plurality of second reflectors 220e. The solid-state light-emitting devices 220b and the light-incoupling component 220c are configured on the carrier 220a. The light-incoupling component 220c has a bottom surface B, a top surface T, a plurality of side surfaces S adjoining the bottom surface B and the top surface T, and a through hole H extending from the bottom surface B to the top surface T. The solid-state light-emitting devices 220b are located in the through hole H. The first reflector 220d covers the through hole H. The second reflectors 220e are configured on the side surfaces S of the light-incoupling component 220c. Light emitted from the solid-state light-emitting devices 220b enters the light-incoupling component 220c via a sidewall SW of the through hole H and leaves the light-incoupling component 220c via the top surface T. Besides, the first reflector 220d and the top surface T of the light-incoupling component 220c are adhered to the light-incident surface 210a of the LGP 210 via the corresponding optical clear adhesive 230.

The carrier 220a of this embodiment is a circuit board, for instance. The circuit board is, for example, the well-known FR-4 printed circuit board, FR-5 printed circuit board, metal core printed circuit board (MCPCB), and so on. Besides, the circuit board can also be a flexible printed circuit (FPC).

The solid-state light-emitting devices 220b are side-view LED packages, for instance. Additionally, the solid-state light-emitting devices 220b are mounted on the carrier 220a by surface mount technology (SMT), and the solid-state light-emitting devices 220b are electrically connected to the carrier 220a, for instance. Moreover, each of the solid-state light-emitting devices 220b of this embodiment has a light-emitting surface E, and each of the light-emitting surfaces E faces the sidewall SW of the through hole H.

Figure 3:
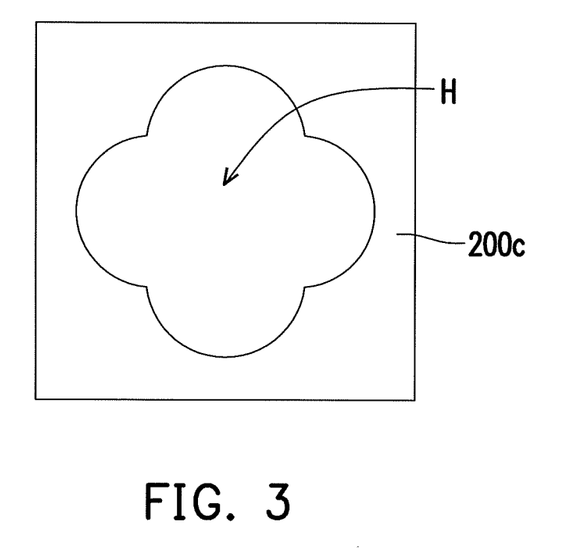
FIG. 3 is a schematic view illustrating a light-incoupling component according to another embodiment of the invention.

In this embodiment, the light-incoupling component 220c is a square light-incoupling component that has a side length ranging from about 10 millimeters to about 20 millimeters, for example. The through hole H of the light-incoupling component 220c is a circular through hole (shown in FIG. 2C and having a diameter from about 5 millimeters to about 8 millimeters), an elliptical through hole (not shown), or a polygonal through hole (not shown), for example. According to other embodiments of the invention, the sidewall SW of the through hole H can include a plurality of curved surfaces and a plurality of crest lines exist can be observed between the curved surfaces, as shown in FIG. 3. In this case, the design of the through hole H enhances uniformity of light distribution. The shape of the first reflector 220d can be adjusted in accordance with the shape of the through hole H in this embodiment. That is to say, the shape of the first reflector 220d and the shape of the through hole H are substantially the same. However, the shape of the first reflector 220d is not limited in this embodiment.

Note that the first reflector 220d shields and/or reflects the light emitted from the solid-state light-emitting devices 220b, such that most of the light can enter the light-incoupling component 220c from the sidewall SW of the through hole H and leave the light-incoupling component 220c from the top surface T. The first reflector 220d can prevent parts of the light emitted from the solid-state light-emitting devices 220b from being directly transmitted in an upward manner and passing through the corresponding optical clear adhesive 230 and the LGP 210. Therefore, the first reflector 220d can resolve the issue of excessively concentrated light above the solid-state light-emitting devices 220b. In this embodiment, the first reflector 220d is a reflective plate, and the first reflector 220d and the top surface T of the light-incoupling component 220c are substantially on the same plane. However, the horizontal position of the first reflector 220d is not limited in this invention. Namely, the first reflector 220d can be slightly higher than or lower than the top surface T of the light-incoupling component 220c.

As clearly shown in FIG. 2B, a gap is between the first reflector 220d and the solid-state light-emitting devices 220b. In other words, the through hole H for accommodating the solid-state light-emitting devices 220b is not further filled with other materials. Since the medium (e.g., air) in the through hole and the light-incoupling component 220c have different refractive indexes, refraction occurs when the light emitted from the solid-state light-emitting devices 220b passes through the sidewall SW of the through hole H, which is conducive to light scattering. Note that the through hole H can be partially or fully filled with an optical filter to cover the solid-state light-emitting devices 220b in other embodiments of the invention, so as to further protect the solid-state light-emitting devices 220b. The optical filler and the light-incoupling component 220c should have different refraction indexes, such that the light is refracted when passing through the sidewall SW of the through hole H.

In this embodiment, the second reflectors 220e configured on the side surfaces S are a plurality of reflective plates or a plurality of reflective coatings, for instance. The second reflectors 220e reflect parts of the light entering the light-incoupling component 220c to the top of the first reflector 220d and the solid-state light-emitting devices 220b. To be more specific, the light entering the light-incoupling component 220c from the sidewall SW of the through hole H can be categorized into two types. The first type refers to the light directly passing through the top surface T of the light-incoupling component 220c, the optical clear adhesive(s) 230, and the LGP 210. The second type refers to the light passing through the top surface T of the light-incoupling component 220c, the optical clear adhesive(s) 230, and the LGP 210 after the light is reflected by the second reflectors 220e. If the proportion of the two types of light can be arranged appropriately, the uniform planar light source can be obtained according to this embodiment. For instance, people having ordinary skill in the art can selectively make some optical micro-structures on the top surface 210b and/or the bottom surface 210a of the LGP 210, so as to uniformize the light distribution on the top surface 20b of the LGP 210. The optical micro-structures are printed dots, V-cuts, or other optical micro-structures suitable for scattering light, for instance.

Figure 4:
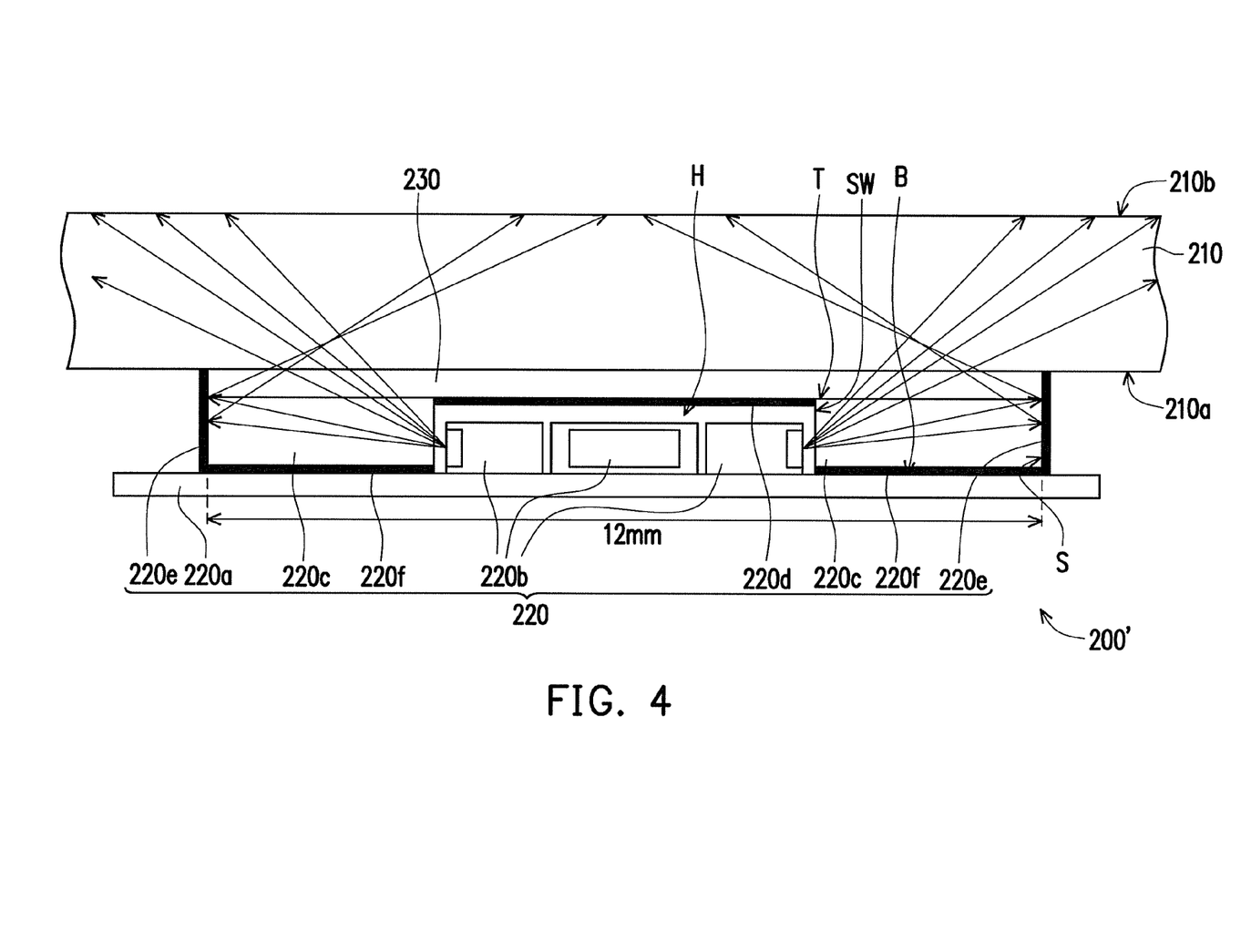
FIG. 4 is a schematic cross-sectional view illustrating a backlight module according to another embodiment of the invention.

FIG. 4 is a schematic cross-sectional view illustrating a backlight module according to another embodiment of the invention. With reference to FIG. 4, the backlight module 200' of this embodiment is similar to the backlight module 200 depicted in FIG. 2B, while the main difference therebetween lies in that the light source 220' of the backlight module 200' in this embodiment further includes a third reflective layer 220f that is configured between the carrier 220a and the bottom surface B of the light-incoupling component 220c. The third reflective layer 220f is a white sheet or any other appropriate reflective plate, for example.

EXPERIMENTAL EXAMPLE

Figure 5:
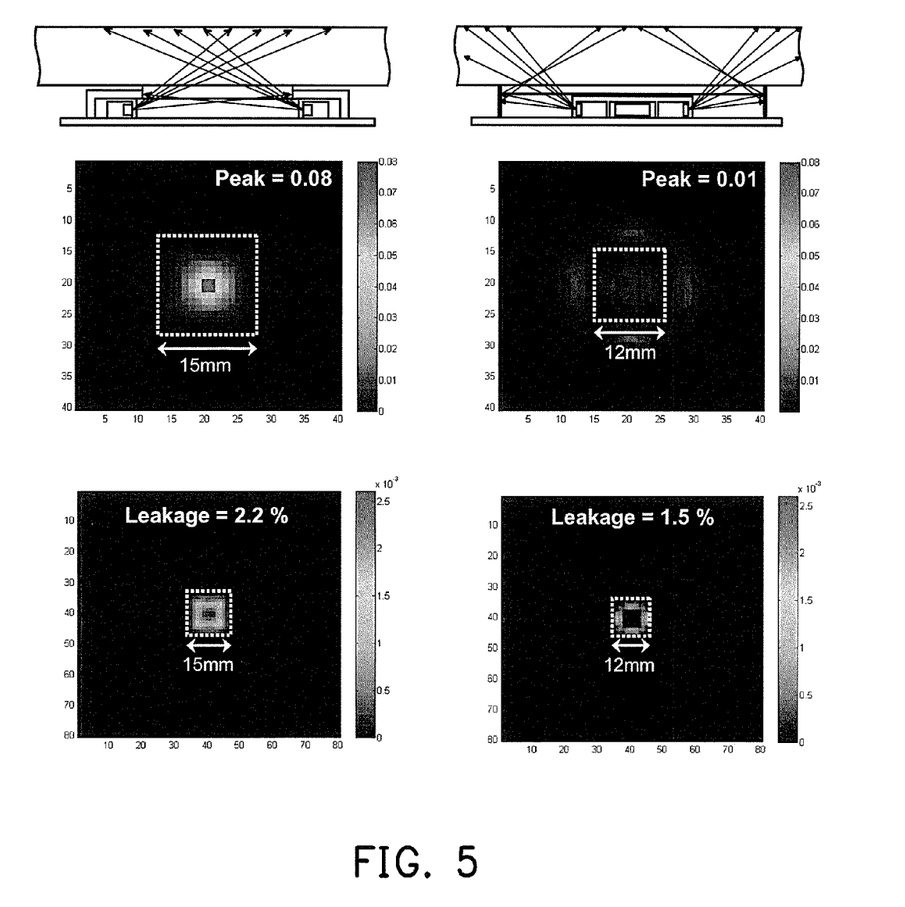
FIG. 5 shows comparison between optical characteristics according to the related art and according to an embodiment of the invention, respectively.

FIG. 5 shows comparison between optical characteristics according to the related art and according to an embodiment of the invention, respectively. With reference to the upper-left and the upper-right irradiance distribution views in FIG. 5, the light source in this invention is designed to achieve better uniformity of light distribution in comparison with the conventional light source. In addition, with reference to the lower-left and the lower-right light leakage energy distribution views in FIG. 5, the light leakage issue of the light source in this invention is rather insignificant in comparison with that issue occurring in the conventional light source.

The solid-state light-emitting devices are configured in the through hole of the light-incoupling component, and the first reflector covering the through hole and the second reflectors configured on the side surfaces of the light-incoupling component allow the light to be emitted uniformly from the top surface of the light-incoupling component according to this invention. Hence, the light source and the backlight module of this invention have favorable optical characteristics.

Although the present invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:

1. A backlight module comprising:
   a light source comprising:
      a carrier;
      a plurality of solid-state light-emitting devices configured on the carrier;
      a light-incoupling component configured on the carrier, the light-incoupling component having a bottom surface, a top surface, a plurality of side surfaces adjoining the bottom surface and the top surface, and a single through hole extending from the bottom surface to the top surface, the solid-state light-emitting devices being located in the single through hole;
      a first reflector covering the through hole;
      a plurality of second reflectors configured on the side surfaces of the light-incoupling component, the plurality of second reflectors are directly in contact with the side surfaces of the light-incoupling component, wherein light emitted from the solid-state light-emitting devices enters the light-incoupling component via a sidewall of the through hole, a part of the light leaves the light-incoupling component via the top surface of the light-incoupling component directly and another part of the light is reflected by the second reflectors before leaving the light-incoupling component via the top surface of the light-incoupling component; and
      a third reflective layer configured between the carrier and the bottom surface of the light-incoupling component, wherein the third reflective layer contacts the carrier; and
   a light guide plate having a light-incident surface and a light-emitting surface opposite to the light-incident surface, wherein the light guide plate is disposed on the top surface of the light in-coupling component such that no hollow area is located between the light guide plate and the light in-coupling component, and the light leaving the light-incoupling component via the top surface of the light-incoupling component enters the light guide plate via the light-incident surface of the light guide plate and leaves the light guide plate via the light-emitting surface of the light guide plate.

2. The backlight module as claimed in claim 1, wherein the carrier comprises a circuit board.

3. The backlight module as claimed in claim 1, wherein the solid-state light-emitting devices comprise side-view light-emitting diode (LED) packages.

4. The backlight module as claimed in claim 1, wherein each of the solid-state light-emitting devices has a light-emitting surface, and each of the light-emitting surfaces faces the sidewall of the through hole.

5. The backlight module as claimed in claim 1, wherein a shape of the first reflector and a shape of the through hole are substantially the same.

6. The backlight module as claimed in claim 1, wherein the through hole comprises a circular through hole, an elliptical through hole, or a polygonal through hole.

7. The backlight module as claimed in claim 1, wherein the sidewall of the through hole comprises a plurality of curved surfaces.

8. The backlight module as claimed in claim 1, wherein the first reflector is a reflective plate, and the first reflector and the top surface of the light-incoupling component are substantially on the same plane.

9. The backlight module as claimed in claim 8, wherein a gap is between the first reflector and the solid-state light-emitting devices.

10. The backlight module as claimed in claim 1, wherein the second reflectors comprise a plurality of reflective plates or a plurality of reflective coatings.

11. The backlight module as claimed in claim 1, wherein the at least one light source further comprises an optical filler filling the through hole and encapsulating the solid-state light-emitting devices, a refractive index of the optical filler is different from a refractive index of the light-incoupling component.

12. The backlight module as claimed in claim 1, wherein a top surface of the light guide plate has a plurality of optical micro-structures.

13. The backlight module as claimed in claim 1, wherein a bottom surface of the light guide plate has a plurality of optical micro-structures.

14. The backlight module as claimed in claim 1, further comprising at least one optical clear adhesive, the first reflector of the at least one light source and the top surface of the light-incoupling component being adhered to the light-incident surface of the light guide plate via the at least one optical clear adhesive.

15. The backlight module as claimed in claim 1, wherein a projection of the third reflective layer in a vertical direction is completely overlapped with the carrier, and the vertical direction is perpendicular to the bottom surface of the light-incoupling component.

16. The backlight module as claimed in claim 1, wherein the solid-state light-emitting devices comprises a first solid-state light-emitting device, a second solid-state light-emitting device, a third solid-state light-emitting device, and a fourth solid-state light-emitting device, the first solid-state light-emitting device emits a first light in a first direction, the second solid-state light-emitting device emits a second light in a second direction, the third solid-state light-emitting device emits a third light in a third direction, the fourth solid-state light-emitting device emits a fourth light in a fourth direction, and the first direction, the second direction, the third direction, and the fourth direction are different from each other.

17. The backlight module as claimed in claim 1, wherein the first light, the second light, the third light, and the fourth light are mixed in the light-incoupling component before leaving the light-incoupling component.

18. The backlight module as claimed in claim 16, wherein the first direction is perpendicular to the second direction, the second direction is perpendicular to the third direction, and the third direction is perpendicular to the fourth direction.

19. The backlight module as claimed in claim 1, wherein the light guide plate does not comprise small particle scattered within the light guide plate.

* * * * *